Oct. 17, 1967  E. A. MILLER ET AL  3,346,936
MANUFACTURE OF INFLATED METAL PRODUCTS
Filed Aug. 17, 1964  2 Sheets-Sheet 1
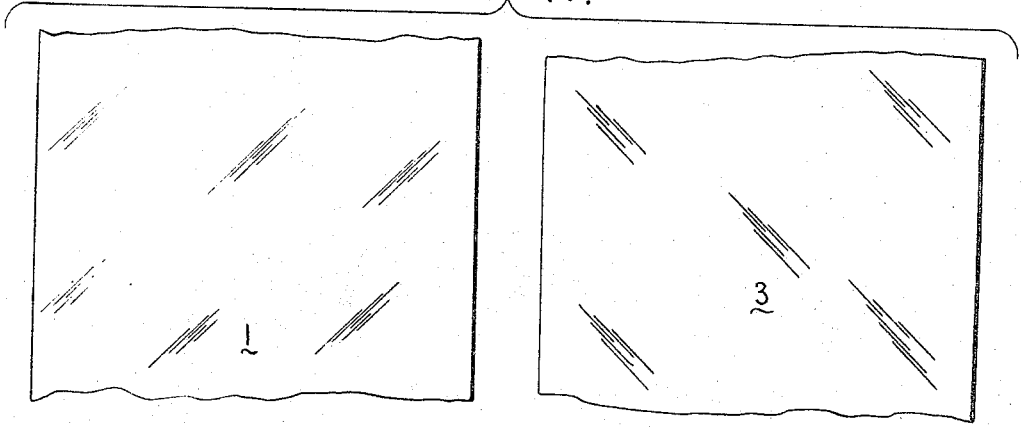
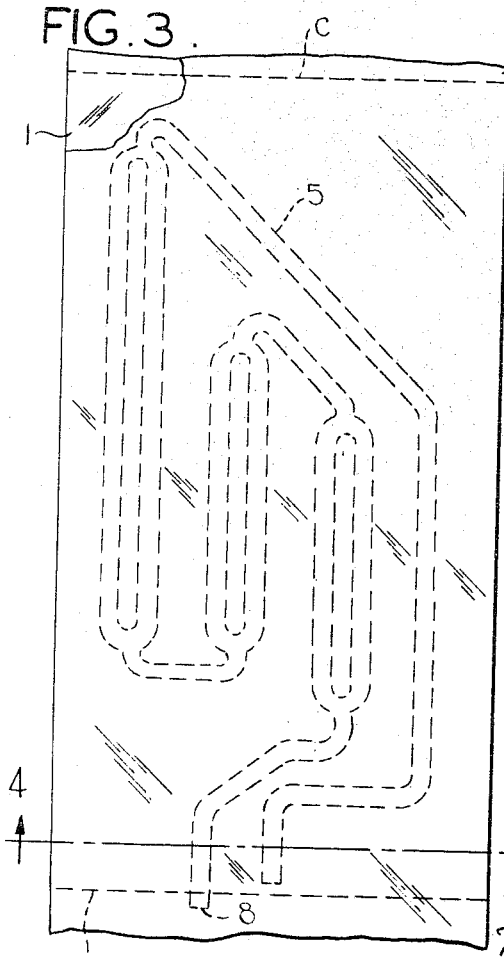
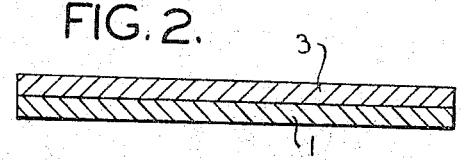
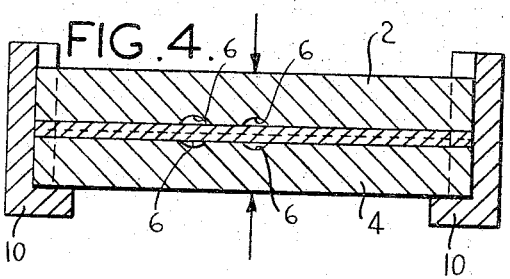
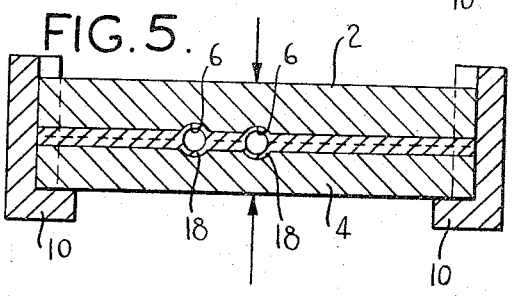
Edwin A. Miller,
Robert A. Schultheiss,
Koenig, Senniger, Powers and Leavitt,
Attorneys.

Oct. 17, 1967    E. A. MILLER ET AL    3,346,936
MANUFACTURE OF INFLATED METAL PRODUCTS
Filed Aug. 17, 1964    2 Sheets-Sheet 2

United States Patent Office 3,346,936
Patented Oct. 17, 1967

3,346,936
MANUFACTURE OF INFLATED METAL PRODUCTS
Edwin A. Miller and Robert A. Schultheiss, Attleboro, Mass., assignors to Texas Instruments Incorporated, Dallas, Tex., a corporation of Delaware
Filed Aug. 17, 1964, Ser. No. 389,935
2 Claims. (Cl. 29—157.3)

ABSTRACT OF THE DISCLOSURE

Metal strips are interfacially solid-phase bonded by reduction between rolls to provide a green bond which is partially improved by heating. The resulting composite strip is cut into composite sheets which are placed between matrix holding dies. One or both dies are incised according to a pattern desired for inflation between components of the sheets. While between the dies, a fluid pressure connection is made between the sheet components to separate and inflate them according to the die pattern. After release of pressure and removal from the dies, the composite is sintered by heating to produce a strong bond between the sheets where uninflated.

---

Among the several objects of the invention may be noted the low-cost production of stronger composite sheets than heretofore available, containing inflations between sheets; and the provision of a method of production of such composite sheets which permits extensive inflations thereof and assures a high degree of accuracy of their shapes. Other objects and features will be in part apparent and in part pointed out hereinafter.

The invention accordingly comprises the elements and combinations of elements, steps and sequence of steps, features of construction and manipulation, and arrangements of parts which will be exemplified in the constructions and methods hereinafter described, and the scope of which will be indicated in the following claims.

In the accompanying drawings, in which several of various possible embodiments of the invention are illustrated, FIG. 1 is a diagrammatic plan view illustrating two starting sheets or strips for carrying out the invention;

FIG. 2 is a cross section showing one of the strips of FIG. 1 superimposed on the other;

FIG. 3 is a diagrammatic plan view of the superimposed strips of FIG. 2 after a squeezing operation, the dotted lines indicating a typical pattern of inflation to be obtained in subsequent steps;

FIG. 4 is a cross section taken on line 4—4 of FIG. 3 with the addition of certain forming dies for inflation according to said pattern;

FIG. 5 is a view similar to FIG. 4 showing conditions after an inflating step between the dies;

Corresponding reference characters indicate corresponding parts throughout the several views of the drawings. For clarity in the drawings, the thicknesses of thin parts are exaggerated.

Figure 7:
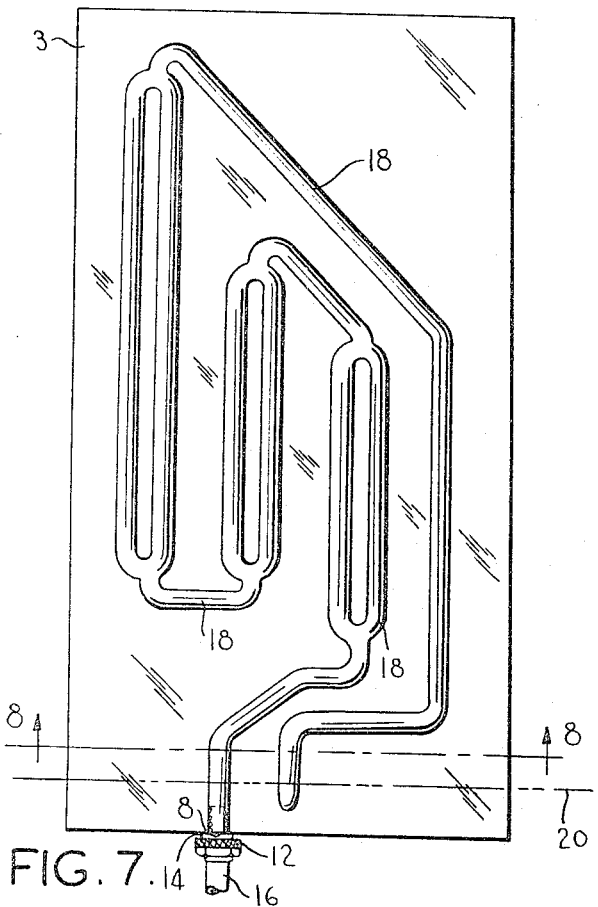
FIG. 7 is a plan view of an inflated composite with the dies removed.

Hereinafter the term "sheet" will be understood to comprehend plates, strips or other areas of metal useful for carrying out the invention, and the term "metals" includes their alloys.

Inflated products made between holding dies from bonded sheets are known. This was accomplished by holding the sheets between matrix dies. The dies had recesses or matrix shapes like those of the patterns. Hydraulic pressure applied between the sheets over the pattern area separated or inflated them so as to take the matrix shapes. However, the bonding heretofore employed before inflation was accomplished by hot-rolling of the sheets. This had the disadvantage that the strength of the hot-rolled bond between sheets was limited to such as could be successfully separated by gaseous or hydraulic inflation in the pattern area. Then there was no possibility of substantially improving such bonds outside of the pattern area after the inflation. Therefore the final bond strength was limited to such only as would permit the effective carrying out of the inflating process.

By means of the present invention, very strong interfacial bonds between the sheets can be obtained, free of the former difficulty that their strength was limited by the requirements for inflation. This is accomplished by employing a two-step bonding process wherein inflation occurs after a weak bonding step and full bond strength is obtained after inflation has been completed.

Referring now more particularly to FIG. 1, there are shown at numerals 1 and 3 sheets in the form of strips of any malleable metal or metals capable of being solid-phase bonded by processes such as described, for example, in Boessenkool et al. U.S. Patent 2,691,815. These strips may, for example, be SAE 1006 steel .070 inch thick, 10 inches wide and received in indefinite lengths from suitable coils of the same. It is to be understood, however, that other metal strips may be employed and may each be composed of a metal different from that of the other.

Solid-phase bonding processes such as described in Patent 2,691,815 call for careful cleaning of the faces of sheets such as 1 and 3 which are interfacially to be bonded. Next the clean face of the strip 3 is applied to the clean face of the strip 1, as illustrated in FIG. 2. The contiguous strips are then green-bonded throughout their interfacial areas. This is accomplished by passing the strips through compression rolls of a rolling mill so as to squeeze the strips and reduce their thicknesses while pressing their faces together to establish a green bond according to the solid-phase method of the patent above-mentioned. For the example of strips above given, an approximately 70% reduction in their thicknesses may be employed, bringing their total thicknesses after roll-squeezing to .048 inch. Reduction occurs in the solid phase of the metal being bonded. The reduction has the effect of green-bonding the strips while elongating or stretching them, in the direction of their lengths. Such a bond, is strong enough for subsequent handling for processing but considerably weaker than required in ultimate use.

The green-bonded strip is heat treated to effect a partial bond improvement at 900 to 1000° F. for one to two hours at heat. At the same time, there is achieved a softening of the strip to aid in full inflation. The partially improved green-bonded composite strip is then scrubbed and dried thoroughly and then roll-finished to become flat and straight. The composite strip is then segmented or cut into lengths suitable for inflation according to a design, for example as shown by the dotted lines on FIG. 3. This is placed between matrix dies (see FIG. 4).

Each die contains an incised matrix formation 6 of the shape desired and as illustrated by the dotted lines 5 on FIG. 3. Guide means such as shown diagrammatically at 10 may be employed to effect proper registration between the dies and the composite green-bonded sheet. The dies are then held together wtih suitable holding forces such as shown by the arrows in FIGS. 4 and 5.

Figure 6:
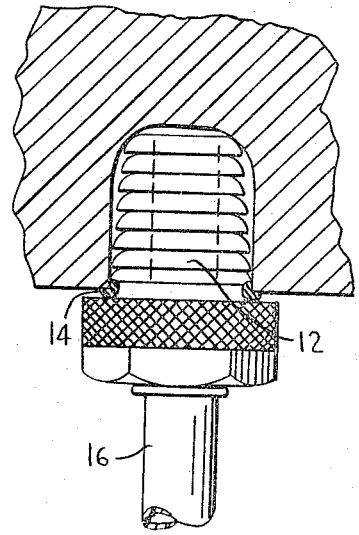
FIG. 6 is a cross sectional detail of a fitting for inflation.

Next, as shown in FIG. 6, a nipple or so-called needle 12 is forced in between the sheets 1 and 3 at the proper location for a terminal portion 8. The nipple 12 is located at the end of a line 16 of a hydraulic fluid pressure system. Hydraulic pressure is then admitted from line 16 through the nipple 12 and into the space between the matrix formations 6. This has an inflating action, separating the weakly green-bonded sheet walls in the area of the desired pattern 5 to form space between 1 and 3. The dies prevent the green bond from breaking elsewhere. In the construction illustrated there results an inflated tubular network 18 between the sheets 1 and 3 as shown in FIG. 7. Finally, the inflated pressure is released and the nipple 12 removed.

Each inflated green-bonded composite 1, 3 is then placed in a furnace for sintering, so as to improve the bond strength above that of the green bond. For the example under consideration, sintering may be accomplished in a furnace at 1200° F. for two hours or at 1700° F. for 10 minutes, for example. For longer periods in the furnace the temperature may be reduced, for example, as low as 800° F. If required for surface protection, a protective atmosphere may be employed in the furnace. This heating converts the comparatively weak green bonds outside of the tubulation 18 into strong solid-phase bonds. Finally, after removal of fitting 12, each composite is cut on a line such as 20 in FIG. 7 to provide for making connections to the lines of refrigerating or heating apparatus.

Figure 8:
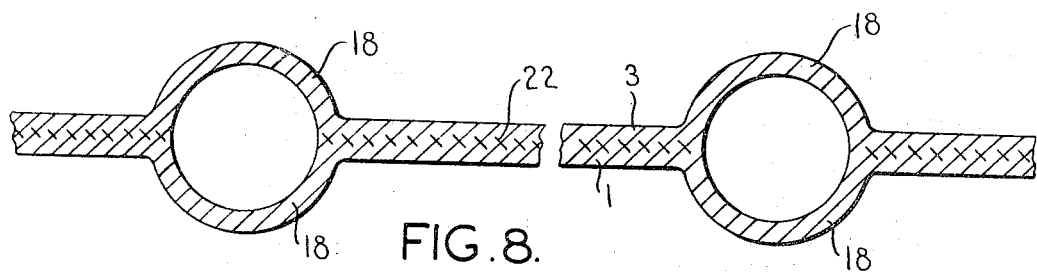
FIG. 8 is an enlarged cross-sectional detail of a finished product, taken on line 8—8 of FIG. 7.

FIG. 8 is illustrative of the typical cross section of the finished product on an enlarged scale. The plane of solid-phase bond is shown by reverse hatching at 22. The strength of the final solid-phase bond can be made to exceed greatly that heretofore obtained by hot-rolling. The bond plane is substantially without voids or inclusions.

Figure 9:
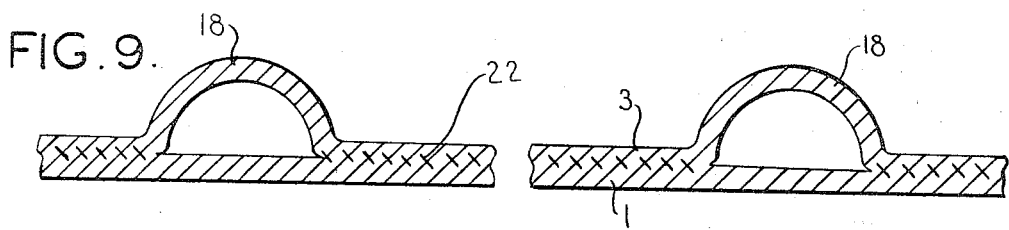
FIG. 9 is a view similar to FIG. 8, illustrating an alternative product made according to the invention.

In FIG. 9 is shown a modified product made by employing a lower die such as 4 but without any recessive matrix formation therein, i.e., its matrix part is flat. In this case, instead of obtaining a more or less circular tubulation as shown in FIG. 8, a more or less semicircular tubulation will be obtained.

The product may be used as a refrigerant evaporating element of a food storage compartment of a refrigerator. An alternative use is for circulation of a warm fluid through the network for heating purposes.

The invention has substantial advantages over the prior die-holding method above referred to, wherein the sheets have been bonded by hot-rolling. According to this prior method, the more the hot-roll strength is increased, the more difficult it becomes to inflate for accurate and best effect into the matrix dies. According to our method, by reason of the initial weak green bond, inflation is easier within the matrix pattern and can be more effectively carried out to conform accurately to the matrix cross section of the dies. Then, after forming has been accomplished, the green-bond strength can be very substantially improved by sintering to an extent exceeding the strength that can be obtained by the former hot-rolling process.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The process of making an inflated composite metal product, comprising interfacially contacting clean metal layers, squeezing the layers together with a thickness reduction to produce a composite sheet having solid-phase green-bonded components, heat-treating the composite sheet to effect a partial improvement in the green bond and to soften said layers, placing the composite sheet between dies at least one of which dies has a recessed pattern, forcing a fluid into the area between the layers outlined by said pattern thereby to inflate and separate portions of at least one of the components from the other component in an area conforming substantially to the pattern and to force said separated portions to conform substantially to said pattern, removing the composite from the dies, and heat-treating the inflated composite further to improve the bonds substantially to full strength.

2. The process of making an inflated contacted composite metal product, comprising interfacially contacting clean metal strips, passing the strips between rolls to squeeze the strips with a thickness reduction to produce a composite strip having solid-phase green-bonded components, heat-treating the composite strip to effect a partial improvement in the green bond and to soften said composite strip, cutting the composite strip into layered composite sheets, placing the composite sheets between dies at least one of which dies has a recessed pattern, forcing a fluid into the area between the sheet layers outlined by said pattern thereby to separate portions of at least one of the components from the other component in an area conforming substantially to the pattern and to force said separated portions to conform substantially to said pattern, removing the segments from the dies, and heat-treating the inflated composite sheets further to improve the bonds substantially to full strength.

References Cited

UNITED STATES PATENTS 2,691,815 10/1954 Boessenkool et al.
2,753,623 7/1956 Boessenkool et al.
3,271,846 9/1966 Buechele et al. _____ 29—157.3

JOHN F. CAMPBELL, *Primary Examiner.*

REUBEN EPSTEIN, *Examiner.*

R. L. GRUDZIECKI, J. D. HOBART,
*Assistant Examiners.*

UNITED STATES PATENT OFFICE
CERTIFICATE OF CORRECTION

Patent No. 3,346,936                          October 17, 1967

Edwin A. Miller et al.

It is hereby certified that error appears in the above numbered patent requiring correction and that the said Letters Patent should read as corrected below.

Column 2, line 54, for "bond, is" read -- bond is --; column 4, line 28, for "inflated contacted composite" read -- inflated composite --.

Signed and sealed this 5th day of November 1968.

(SEAL)
Attest:

Edward M. Fletcher, Jr.                        EDWARD J. BRENNER

Attesting Officer                              Commissioner of Patents